US012253008B1

(12) United States Patent
Winn et al.

(10) Patent No.: US 12,253,008 B1
(45) Date of Patent: Mar. 18, 2025

(54) INTEGRATED TWO-STAGE IMPELLER

(71) Applicant: Hamilton Sundstrand Corporation, Charlotte, NC (US)

(72) Inventors: Alden Lee Winn, Glastonbury, CT (US); Andrew W. Solomon, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/647,636

(22) Filed: Apr. 26, 2024

(51) Int. Cl.
*F01D 9/04* (2006.01)
*F01D 5/22* (2006.01)
*F01D 5/28* (2006.01)

(52) U.S. Cl.
CPC ............... *F01D 9/04* (2013.01); *F01D 5/225* (2013.01); *F01D 5/28* (2013.01); *F05D 2240/12* (2013.01); *F05D 2240/30* (2013.01); *F05D 2300/17* (2013.01)

(58) Field of Classification Search
CPC .... F04D 15/0027; F04D 29/00; F04D 29/185; F04D 29/2211; F04D 29/285
See application file for complete search history.

(56) References Cited

U.S. PATENT DOCUMENTS 4,643,635 A 2/1987 Leachman
8,147,208 B2 * 4/2012 Hagshenas ............ F04D 29/285 416/213 R
10,487,837 B2 11/2019 Tracz et al.
2019/0285080 A1 * 9/2019 Metz ..................... F04D 29/324

FOREIGN PATENT DOCUMENTS

CN 112360763 A * 2/2021 .............. F02B 37/12
JP S6240298 U * 3/1987

* cited by examiner

*Primary Examiner* — Courtney D Heinle
*Assistant Examiner* — Danielle M. Christensen
(74) *Attorney, Agent, or Firm* — Kinney & Lange, P.A.

(57) ABSTRACT

An impeller includes a cylindrical portion defining a fluid inlet, the cylindrical portion coaxial with a rotational axis of the impeller, a hub, a shroud extending downward and radially away from the cylindrical portion and covering the hub, a first plurality of vanes extending between the shroud and the hub, and an extension portion disposed between the shroud and the hub and downstream of the first plurality of vanes. The extension portion includes an outer ring, and inner ring, and a second plurality of vanes extending between the outer ring and the inner ring.

17 Claims, 2 Drawing Sheets

INTEGRATED TWO-STAGE IMPELLER

BACKGROUND

This application relates to an impeller and, more particularly, to a two-stage impeller.

Impellers are traditionally fixed-sized metal components and thus are not very adaptable to varied flow rates. Instead, traditional impellers are designed and evaluated for stability over both low and high flow regimes. As such, these impellers are often more well adapted to one or the other of low and high flow regimes, and significantly less adapted to the other. Accordingly, more adaptable impeller designs are desirable.

SUMMARY

An impeller includes a cylindrical portion defining a fluid inlet, the cylindrical portion coaxial with a rotational axis of the impeller, a hub, a shroud extending downward and radially away from the cylindrical portion and covering the hub, a first plurality of vanes extending between the shroud and the hub, and an extension portion disposed between the shroud and the hub and downstream of the first plurality of vanes. The extension portion includes an outer ring, an inner ring, and a second plurality of vanes extending between the outer ring and the inner ring.

A method of operating an impeller includes introducing a fluid to an inlet of the impeller, and rotating the impeller about an axis to accelerate the fluid through a first plurality of vanes disposed between a shroud and a hub of the impeller and radially outwardly across an extension portion of the impeller. The extension portion includes an outer ring, an inner ring, and a second plurality of vanes extending between the outer ring and the inner ring.

A method of fabricating an impeller includes additively manufacturing, from a metallic material, a hub, a shroud, and a first plurality of vanes extending between the hub and the shroud, and additively manufacturing, from the metallic material, an extension portion between the hub and the shroud. The extension portion includes an outer ring, an inner ring, and a second plurality of vanes extending between the outer ring and the inner ring.

Figure 1:
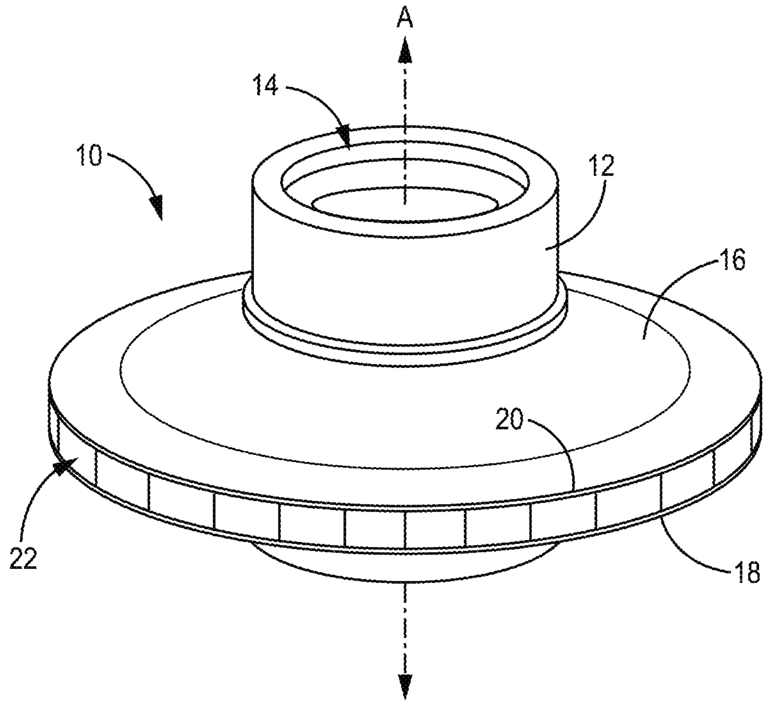
FIG. 1 is a simplified perspective view of an impeller.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a two-stage impeller with adaptable to high and low flow rates. More specifically, the impeller can be fabricated with an impeller extension (i.e., secondary impeller) housed partially within the shroud. This impeller extension increases the working area of the impeller at higher flow rates without changing the footprint of the impeller.

Figure 2:
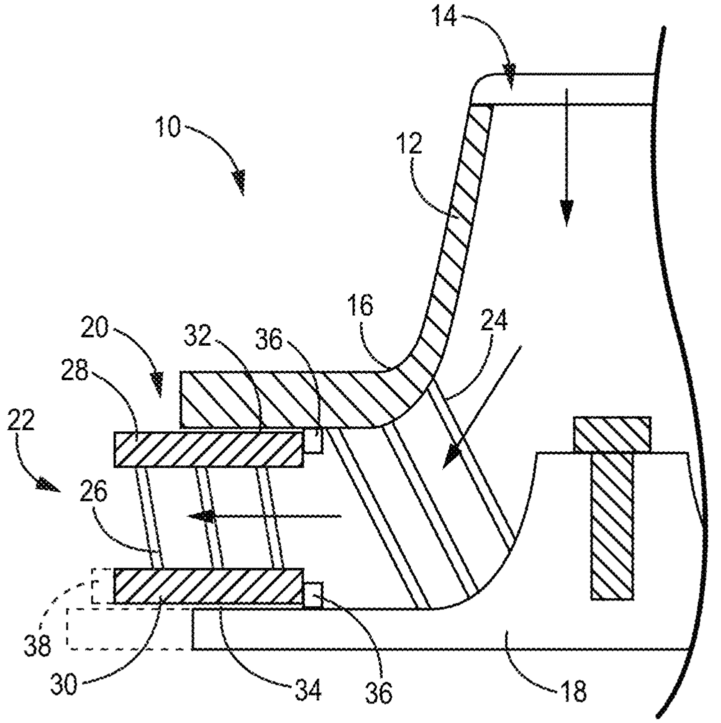
FIG. 2 is a partial cross-sectional view of the impeller of FIG. 1.

FIG. 1 is a simplified perspective view of impeller 10. FIG. 2 is a simplified partial cross-sectional view through impeller 10. FIGS. 1 and 2 are discussed together.

Impeller 10 includes cylindrical portion 12 defining fluid inlet 14, shroud 16, hub 18, and impeller extension 20 disposed in a space between shroud 16 and hub 18. Based on its location between shroud 16 and hub 18, impeller extension 20 can also serve as fluid outlet 22, as the flow of fluid exits impeller 10 through the space between shroud 16 and hub 18. Impeller extension 20 and fluid outlet 22 circumscribe impeller 10. Vanes 24 (FIG. 2) are also disposed between shroud 16 and hub 18 upstream, based on the direction of fluid flow as indicated by arrows, of outlet 22. Impeller 10 is rotatable about axis A.

As can be seen in greater detail in FIG. 2, impeller extension 20 includes vanes 26 extending between respective outer and inner rings 28 and 30. Outer ring 28 interfaces with shroud 16 at first interface 32, and inner ring 30 interfaces with hub 18 at second interface 34. A nominal gap can exist at either/both of the first and second interfaces 32, 34, in particular at relatively lower speeds of impeller 10 during which impeller extension 20 is in a free-floating state. Tabs 36 can optionally be included to help fluidly seal first and/or second interfaces 32, 34 during operation of impeller 10. In an alternative embodiment, hub 18 can be fully coextensive with inner ring 30 and forward locating tab 38 can be included to enhance sealing at second interface 34. Impeller extension 20 can otherwise extend beyond the edges of shroud 16 and/or hub 18 as the radially outermost portion of impeller 10.

In operation of impeller 10, fluid enters into impeller 10 via inlet 14. Fluid can be a liquid such as oil or liquid fuel in an exemplary embodiment, and a gas in an alternative embodiment. Rotation of impeller 10 directs fluid flow radially outward from inlet 14 to outlet 22, accelerating the flow across vanes 24. At relatively low flow rates/rotational speeds, fluid exits outlet 22, but vanes 26 of impeller extension 20 act passively on the fluid. Beyond a threshold fluid pressure which occurs at relatively higher flow rates/rotational speeds, the normal force upon impeller extension 20 exerted by the radially outwardly flowing fluid causes increased friction between inner ring 30 and hub 18 at second interface 34 and vanes 26 actively engages the fluid flow. In this way, impeller extension 20 becomes seated or engaged with hub 18 in a friction fit. Impeller 10 can therefore operate efficiently at low flow rates with vanes 24 (inner vanes) and at high flow rates with the addition of vanes 26 (outer vanes) acting on the fluid flow. Tabs 36 and 38, if included, can help prevent fluid leakage at first and/or second interfaces 32, 34 at both high and low speeds.

Impeller 10 can be formed as a monolithic component, via additive manufacturing, from a metallic material, such as aluminum, stainless steel, or nickel alloy. Fabrication can more specifically include a captured metal printing process to form impeller extension 20 within the space between shroud 16 and hub 18. A single metallic material throughout is preferable to prevent issues with material mismatch.

Discussion of Possible Embodiments

The following are non-exclusive descriptions of possible embodiments of the present invention.

An impeller includes a cylindrical portion defining a fluid inlet, the cylindrical portion coaxial with a rotational axis of the impeller, a hub, a shroud extending downward and radially away from the cylindrical portion and covering the hub, a first plurality of vanes extending between the shroud and the hub, and an extension portion disposed between the shroud and the hub and downstream of the first plurality of vanes. The extension portion includes an outer ring, an inner ring, and a second plurality of vanes extending between the outer ring and the inner ring.

The impeller of the preceding paragraph can optionally include, additionally and/or alternatively, any one or more of the following features, configurations and/or additional components:

The above impeller further includes a first interface region between the outer ring and the shroud, and a second interface region between the inner ring and the hub.

Any of the above impellers can further include a tab upstream of the extension portion and extending downward from the shroud.

Any of the above impellers can further include a tab upstream of the extension portion and extending upward from the hub.

Any of the above impellers can further include a tab downstream of the extension portion and extending upward from the hub.

In any of the above impellers, the extension portion can extend radially outwardly beyond at least one of the shroud and the hub.

Any of the above impellers can further include a fluid outlet at the extension portion.

In any of the above impellers, the impeller can be monolithically formed from a metallic material.

In any of the above impellers, the metallic material can be one of aluminum, stainless steel, and a nickel alloy.

A method of operating an impeller includes introducing a fluid to an inlet of the impeller, and rotating the impeller about an axis to accelerate the fluid through a first plurality of vanes disposed between a shroud and a hub of the impeller and radially outwardly across an extension portion of the impeller. The extension portion includes an outer ring, an inner ring, and a second plurality of vanes extending between the outer ring and the inner ring.

The method of the preceding paragraph can optionally include, additionally and/or alternatively, any one or more of the following features, configurations and/or additional steps:

The above method can further include rotating the impeller about the axis at a speed which achieves a threshold pressure of the fluid such that second plurality of vanes engages the fluid.

In any of the above methods, at the threshold pressure, the extension portion can engage the impeller in a friction fit.

In any of the above methods, the fluid can be a liquid.

Any of the above methods can further include rotating the impeller about the axis at a speed which does not achieve a threshold pressure of the fluid such that the second plurality of vanes does not engage the fluid.

A method of fabricating an impeller includes additively manufacturing, from a metallic material, a hub, a shroud, and a first plurality of vanes extending between the hub and the shroud, and additively manufacturing, from the metallic material, an extension portion between the hub and the shroud. The extension portion includes an outer ring, an inner ring, and a second plurality of vanes extending between the outer ring and the inner ring.

The method of the preceding paragraph can optionally include, additionally and/or alternatively, any one or more of the following features, configurations and/or additional steps:

In the above method, the metallic material can be one of aluminum, stainless steel, and a nickel alloy.

Any of the above methods can further include additively manufacturing, from the metallic material, at least one tab on the hub.

In any of the above methods, the least one tab can be disposed fluidly upstream of the extension portion.

In any of the above methods, the least one tab can be disposed fluidly downstream of the extension portion.

Any of the above methods can further include additively manufacturing, from the metallic material, at least one tab on the shroud.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An impeller comprising:
- a cylindrical portion defining a fluid inlet, the cylindrical portion coaxial with a rotational axis of the impeller;
- a hub;
- a shroud extending downward and radially away from the cylindrical portion and covering the hub;
- a first plurality of vanes extending between the shroud and the hub; and
- an extension portion disposed between the shroud and the hub and downstream of the first plurality of vanes, the extension portion comprising:
  - an outer ring;
  - an inner ring; and
  - a second plurality of vanes extending between the outer ring and the inner ring.

2. The impeller of claim 1 and further comprising:
- a first interface region between the outer ring and the shroud; and
- a second interface region between the inner ring and the hub.

3. The impeller of claim 2 and further comprising: a tab upstream of the extension portion and extending downward from the shroud.

4. The impeller of claim 3 and further comprising: a tab upstream of the extension portion and extending upward from the hub.

5. The impeller of claim 4 and further comprising: a tab downstream of the extension portion and extending upward from the hub.

6. The impeller of claim 2, wherein the extension portion extends radially outwardly beyond at least one of the shroud and the hub.

7. The impeller of claim 2 and further comprising: a fluid outlet at the extension portion.

8. The impeller of claim 2, wherein the impeller is monolithically formed from a metallic material.

9. The impeller of claim 8, wherein the metallic material is one of aluminum, stainless steel, and a nickel alloy.

10. A method of operating an impeller, the method comprising:

introducing a fluid to an inlet of the impeller; and rotating the impeller about an axis to accelerate the fluid through a first plurality of vanes disposed between a shroud and a hub of the impeller and radially outwardly across an extension portion of the impeller, the extension portion comprising:

an outer ring;

an inner ring; and a second plurality of vanes extending between the outer ring and the inner ring; and wherein the impeller is rotated about the axis at a speed which achieves a threshold pressure of the fluid such that the second plurality of vanes engages the fluid, wherein at the threshold pressure, the extension portion engages the impeller in a friction fit.

11. The method of claim 10, wherein the fluid is a liquid.

12. A method of fabricating an impeller, the method comprising:

additively manufacturing, from a metallic material, a hub, a shroud, and a first plurality of vanes extending between the hub and the shroud; and additively manufacturing, from the metallic material, an extension portion between the hub and the shroud, the extension portion comprising:

an outer ring;

an inner ring; and a second plurality of vanes extending between the outer ring and the inner ring.

13. The method of claim 12, wherein the metallic material is one of aluminum, stainless steel, and a nickel alloy.

14. The method of claim 12, and further comprising: additively manufacturing, from the metallic material, at least one tab on the hub.

15. The method of claim 14, wherein the least one tab is disposed fluidly upstream of the extension portion.

16. The method of claim 14, wherein the least one tab is disposed fluidly downstream of the extension portion.

17. The method of claim 12 and further comprising: additively manufacturing, from the metallic material, at least one tab on the shroud.

* * * * *